United States Patent Office 3,070,098
Patented Dec. 25, 1962

3,070,098
PROCESS FOR CURING AND PRESERVING PLANTS
Eggo J. Tempel, West Hartford, and Frederik A. Bruist, Bloomfield, Conn., assignors to American Sumatra Tobacco Corporation, New York, N.Y., a corporation of Delaware
No Drawing. Filed Feb. 29, 1960, Ser. No. 11,480
2 Claims. (Cl. 131—140)

This invention relates to the curing of plant material, and more particularly to a process for curing tobacco leaves.

Tobacco may be harvested either leaf by leaf, or plant by plant. In the first method, the leaves are sequentially removed from the plant as they mature, i.e., first the lower leaves, then the middle leaves, and finally the top leaves. In the second method, the entire stalk is harvested in one operation.

After harvesting, the tobacco is subjected to a drying process. If the tobacco has been harvested leaf by leaf, the leaves are strung together for this purpose and suspended in a barn by means of stricks or lathes. If the tobacco has been harvested plant by plant, the whole plants are suspended in a barn in a similar manner. Where individual leaves of approximately equal maturity have been harvested and suspended, it takes the tobacco a few days to undergo a preliminary discoloration from a hard green to a yellowish mellow green.

The drying of tobacco intended for the cigar industry is usually restricted to natural drying, i.e., the tobacco is left in the barn after said preliminary discoloration for a period which may extend up to several months, either without application of any artificial heat, or with application of a minor amount of heat by means of small fires, mainly to improve the air circulation. The drying process is continued until the leaves are fully dried and have attained a generally brownish, although far from even color. During periods of high atmospheric humidity, the dried leaves absorb varying amounts of moisture, i.e., from 20 to 25 percent for shade grown tobacco, and from 15 to 40 percent for various other types, whereby they assume a silky or soft texture. During such a moist period, the leaves are bundled in hands, and transferred to sweat rooms for subsequent fermentation in large stacks, called "bulks."

In the case of stalk-cut plants, the discoloration during the above described drying process occurs gradually and more or less from leaf to leaf; the top leaves are much slower to yellow up than the older leaves at the bottom of the stalk. Some of the top leaves never pass through a yellow stage, but change from green to a dark, almost black color. These top leaves are of inferior quality and are sold for a low price. Thus, although the plant by plant method is preferable from the harvesting point of view, in particular because it allows for an automation of the harvesting procedure, it has the disadvantage of yielding a final product of unequal quality, whereby the proceeds are diminished.

The drying process for leaves intended to be used in the production of cigarette tobaccos also includes the first step of the aforesaid natural drying, but only to a predetermined degree, i.e. until the leaves have assumed a lemon color. At that time an abundance of artificial heat is applied to the tobacco in the barn, whereby the drying process is drastically accelerated and the leaves attain a final dried stage known as "flue-cured" tobacco. Flue-curing is much faster than natural drying, and it results in most cases in a yellowish color and in an early arrested transformation of the chemical components inside the tobacco leaf, whereby the final product lacks the texture and composition generally required for the cigar industry.

"Fire-curing" is a process closely related to flue-curing, the principal difference being in the predetermined time at which the artificial heat is applied.

After the flue-curing or fire-curing step, the tobacco so treated is almost ready for use, i.e., apart from a more or less extended aging period its principal curing has been completed. Thus, the curing of cigarette tobacco can be said to consist primarily of one treatment, to wit, a drying process of which the last part is drastically accelerated, whereas the curing of the cigar type tobacco consists of two subsequent and equally important treatments, a drying process and a fermentation process.

The fermentation, applied to the cigar type leaves as a second part of the curing process, is accomplished by removing the dry but pliable hands of tobacco, containing varying amounts of moisture depending on the type involved, from the barns and stacking them in close relation in piles in the aforesaid bulks.

These bulks, often weighing up to 5000 pounds, are placed in substantially enclosed sweat rooms in which the temperature is maintained at approximately 80° F., and the relative humidity between 70 and 80 percent.

As a result of more or less spontaneous heat generated largely within the vascular portions of the closely compacted leaves, the central portions of the bulks attain varying temperatures over a period of several weeks. These temperatures depend on the type of tobacco, the conditions during the past growing season and other variable factors. Maximum temperatures achieved in the central portions of individual bulks commonly vary between 95° F. and 120° F. The varying degrees of fermentation result in varying degrees of chemical and physical changes which produce more or less effectively the desired "finish" of the leaves, the uniform light brownish color, the "lively," elastic and glossy texture, the "free burn," and the good taste and aroma of the burning leaf as required by the cigar industry.

In order to accomplish a reasonably uniform and complete fermentation, it is necessary that each bulk is periodically unpacked and repacked to interchange the "cold" outer hands with the "hot" inner hands in each bulk. Five "turns" or hand by hand repackings of each bulk are often a minimum requirement to complete the fermentation, so that all fermented leaves assume more or less the desired characteristics while retaining a "live" pliable texture for indefinite compact storage until future use in the cigar manufacture.

During the fermentation process, many of the hands become dehydrated and subject to loss from fracture, which necessitates re-moistening of the hands by placing them on conveyor means and passing them through a moisture laden chamber for absorption of additional moisture. Only then can the leaves be safely subjected to subsequent sorting operations that are often required before the tobacco is baled for storage. Heavy pressures, often amounting to 60 pounds per square foot, in the lower part of the bulk are unavoidable in order to generate the necessary heat and as a result a considerable percentage of the fermented leaves show unfavorable pressure-streaks and colors that are darker than desirable, again depending on the type and the condition of the tobacco, while many of the hands acquire a highly compressed or "matted" condition causing considerable loss due to the breakage during the subsequent separation of the hands and the individual leaves. In general, the fermentation process takes about two months.

It will be clear from the above explanation that the conventional tobacco curing processes leave much to be desired, as they take up an excessive amount of time, need a great deal of manual labor, yield a final product of non-uniform quality, and cause substantial losses of material.

Similar difficulties are encountered in the curing of other plants than tobacco, such as hops and tea.

It is the main object of the present invention to provide a novel process for curing plant portions, whereby the above-mentioned disadvantages are obviated.

Another object of the invention is to provide a novel drying process for freshly harvested tobacco leaves which takes substantially less time than the conventional processes while yielding a final product of at least equal quality.

Still another object of the invention is to provide a novel drying process for freshly harvested whole tobacco plants which takes substantially less time than the conventional processes and yields a uniform final product.

A further object of the invention is to provide a novel fermentation process for dried tobacco leaves which takes substantially less time than the conventional process.

A still further object of the invention is to provide a novel fermentation process for dried tobacco leaves whereby a final product of more uniform quality is obtained and the losses are substantially reduced.

With these objects in mind, the main feature of the invention consists of the step of isolating the plant portions from the regional atmosphere during at least part of the curing process. In the case of most of the tobacco intended for the cigar industry, where the curing process consists of two subsequent and equally important treatments, said isolation from the atmosphere may be performed either during the initial stage of the drying process, during the entire fermentation process, or during both the said stages.

The exact nature of the invention and any further objects and advantages thereof will appear from the following description.

In the practice of the invention, as applied to a tobacco primary curing process, freshly harvested green tobacco leaves, or entire green stalks of tobacco are packed in loose piles of varying size, after which each pile is enclosed and substantially hermetically sealed in a plastic container or in a container of a similar airtight moisture resistant material, and permitted to stand at the normal regional temperature. In this way the biological degeneration process, beginning with wilting and followed by the yellowing of the leaves, will occur within a much shorter period of time than during the conventional suspension in barns. All of the leaves assume a desirable and intense yellow color and attain a primary cure or preliminary discoloration within one to three days, depending on the type of tobacco, which degree of yellowing simultaneously affects both the mature leaves and the leaves that are commonly considered as immature.

The isolation of the plants or leaves from the atmosphere by means of the said airtight containers appears to accelerate certain complex physical and chemical changes within the leaves of the presence of only the scant residual air entrapped within the containers when sealed. The lack of abundant atmospheric oxygen and the increased concentration of carbon dioxide inside the sealed container is believed to be responsible for the absence of rot during the primary cure (normally an immediate problem in too densely suspended freshly harvested tobacco under conventional conditions) and for the early and much increased formation of carotenes that produce the bright yellow color.

Because of the liberal moisture release from the leaves or plants during this initial curing, adsorption means is provided within or in communication with each container for absorbing and retaining the moisture exuded from the plants.

A quantity of silica gel or other well known adsorbants retained in a suitable retainer is placed within each hermetically sealed container for absorbing the moisture vapor exuded by the plant portions contained therein.

In practice, approximately three percent silica gel by weight compared to the weight of the plants in each container has been found to absorb sufficient moisture during the biological degeneration of the plant portions during the desired curing period. Since only a scant amount of air is entrapped with the plant portions when the latter are sealed therein, it is believed that the generation of carbon dioxide by the plants, together with the means for producing a substantially dehydrated atmosphere with a minimum of free oxygen surrounding all surfaces of the plant portions provides a rapid control effect upon the biological degeneration of the plant portions resulting in uniform coloration and dryness without attendant brittleness whereby the plants may be subjected to further rapid drying and fermentation without appreciable loss from discoloration, brittleness and rot.

The now thoroughly and uniformly yellowed leaves, or full stalks, are removed from the sealed containers and exposed to a further drying process. Because of the very advanced and uniform changes accomplished inside the sealed containers, this further drying process can be greatly accelerated by the use of an artificially heated airflow by the use of well known means in a controlled atmosphere which is to the great benefit of the ultimate uniformity, quality and characteristics of the tobacco. Consequently, the drying process can now be reduced from many weeks to a few days to achieve a "natural cure" retaining the "live" texture and other required characteristics for cigar tobaccos, and from days to only hours to arrive at exceptionally desirable and uniformly dried tobaccos of the "flue-cured" or "fire-cured" type.

In addition, it has been found that for certain types of tobacco, especially those used for the "filler" of cigars and those used for the manufacture of cigarettes, a coarse slicing of the thoroughly yellowed leaves immediately after removal from the sealed containers permits a more rapid drying time than previously described, and a perfect control of the degree and types of curing, i.e.: from a relatively long, average 36–48 hours, "natural-cure" at varying moderate temperatures down to a very fast "flue-cure" or "fire-cure" in a matter of 6–24 hours at temperatures as high as 160° F.

After the tobacco has been dried in the aforesaid shortened period, the leaves, or the sliced parts thereof, are of an exceptionally uniform color and texture and much superior to the leaves dried in the conventional manner.

At the completion of the accelerated drying process, the cigar type tobacco leaves are allowed to regain various degrees of moisture content, by exposure to a controlled atmosphere having a humidity between 50–70% for instance from 18 to 22 percent on a dry weight basis for shade tobacco, and up to 30 percent for Connecticut broadleaf variety. The leaves are now ready for the fermentation process.

In a preferred embodiment of the invention as applied to the fermentation of tobacco leaves, dried leaves, obtained either by the conventional natural drying process or by the shortened drying process described hereinbefore, which have been allowed to absorb moisture so as to make them soft and pliable again, are packed in loose, close proximity to each other in substantially hermetically sealed containers, made of plastic or of another suitable airtight moisture resistant material, which are in turn retained in wood or cardboard cases.

These cases are then placed in fermentation rooms in which artificial heat is applied and the temperature elevated to a range governed by the type of tobacco involved. The optimum range for shade tobacco is between 110° and 120° F., and for cigar filler types between 120° and 140° F. Under these conditions, all tobacco in the containers quickly assume this elevated temperature and a uniform fermentation of all tobacco within each container occurs without the previously required handling and repacking. After fermentation, no humidification is necessary to permit further handling, and the pressure on the fermenting tobacco is limited by the relatively small weight of the tobacco inside each container, which for shade tobacco has been found the most practical between 100 and 170 pounds. The density of the packing in the container is the most important governing factor; for shade tobacco, it has been found that optimum results are obtained from a density of 9 to 11 pounds per cubic foot. The precise weight of the tobacco in each container is less important, except that the pressure on the bottom layer should not exceed substantially 25 pounds per square foot.

Within a period of 10 to 20 days, the above fermentation at elevated temperatures is completed, and at this point, all the leaves inside the container will have assumed an excellent fermented finish, and retained the soft and pliable texture desired by the cigar industry. The containers are then transferred to cool storage rooms having a controlled temperature between 50–70 degrees F., wherein the tobacco will adjust itself within one or two days to the room temperature. At this time, the containers are opened and the tobacco is either ready for preservation in storage for early or future use, or for the subsequent sorting operation that is required for certain tobacco types for different end uses.

Contrary to the popular concept, it has been found that a great advantage of the fermentation of tobacco in substantially hermetically sealed containers consists of the much larger air exclusion as compared to the conventional bulk fermentation. This prevents or retards excessive oxidation processes which normally darken the tobacco to an undesirable extent. Because the tobacco is enclosed with only a limited quantity of atmospheric air during the fermentation, the carbon dioxide produced in each container is stabilized at a high level of approximately 2 percent by volume, resulting in a beneficial effect not only on the color but also on the taste and the aroma of the fermented tobacco. The fact that the generated carbon dioxide is retained and cannot dissipate as in the conventional bulk fermentation has been found important for still another reason. In the early and slow stages of fermentation at temperatures below 110° F., bacterial action is often responsible for the oxidation of amino acids, resulting in the formation of free ammonia. This affects the tobacco with a pungent, sharp or harsh taste and aroma. At temperatures around 110° F., this bacterial ammoniacal fermentation is suppressed, so that the quick elevation of the temperature inside the containers together with the presence of an overbalance of carbon dioxide minimizes the formation of free ammonia.

It is to be noted that not infrequently certain seasons produce tobacco that is difficult to bring to fermentation in the conventional bulks. Often these bulks cannot be brought into the optimum temperature range, resulting in tobacco with an undesirable finish and a poor taste and aroma. This objectionable feature is absent in the above described fermentation process according to the invention.

It is also to be noted that, because of the relatively low gravitational pressures inside the containers, losses from compacting or matting are substantially nil, as the leaves remain in a somewhat fluffy condition as compared to the highly compressed condition in the conventional bulk method of fermentation.

The aforesaid hermetically sealed containers used in the drying process and in the fermentation process according to the invention, are preferably made of a plastic sheet material, which is either folded with lapped closures or made in the form of bags adapted for end sealing. In the drying process, especially where whole plants are concerned, it is also feasible to make use of plastic curtains which are closely draped around the suspended plants, and sealed by folding the edges over each other. A wide variety of non-hygroscopic materials compatible to manual handling and to the above temperatures may be used for the containers. Polyethylene and "Pliofilm" have been found satisfactory. However, it is to be understood that rigid containers applicable to substantially hermetic sealing may be alternatively used.

In the drying process, it is of some importance that the containers are opaque, as the discoloration of the leaves might otherwise be influenced by light, which would cause the leaves on the outside to change color at a faster rate than the inner leaves. Good results have been obtained with black colored "Pliofilm" sheets. For the fermentation process, this quality of the containers is of less importance, as the containers are retained in wood or cardboard cases.

As the effect of enclosing the leaves in substantially hermetically sealed containers is to be ascribed to the low oxygen and high carbon dioxide contents of the atmosphere inside the enclosure, it is also feasible to put the freshly harvested leaves or plants, or the dried leaves to be fermented, in a chamber wherein an atmosphere with a low oxygen and high carbon dioxide content is artificially generated.

The invention will be further explained by reference to the following examples.

*Example I*

This example relates to the curing of cigarette tobacco. Freshly harvested green tobacco plants of the Gold Dollar variety are assembled in piles each containing about 100 plants with a total weight of about 400 pounds. Each of these piles is enclosed in a black "Pliofilm" sheet which is closely wrapped around the pile and substantially hermetically sealed by folding the edges over each other; 15 pounds of silica gel are enclosed together with each pile to absorb the excess moisture exuded by the leaves.

The enclosed piles are placed in a closed room and allowed to stand at room temperature (about 90° F.) for two days. After that time the piles are unwrapped and the leaves are found to have assumed a uniform lemon color.

The leaves are now either suspended in a barn or placed on a grid and exposed to an artificially heated relatively dry regional air flow having a temperature of about 160° F. for six hours. After that time, a perfect, uniformly colored tobacco of the "flue-cured" type is found to be obtained.

*Example II*

This example relates to the drying of cigar filler tobacco. Freshly harvested whole tobacco plants of the All Purpose Connecticut variety are suspended in a closed room in groups each containing about 100 plants with a total weight of about 600 pounds. A curtain of black "Pliofilm" is closely wrapped around each group and substantially hermetically sealed by folding the edges over each other; 20 pounds of silica gel are enclosed with each group to absorb the excess moisture exuded by the plants.

The enclosed plants are allowed to stand at room temperature (about 90° F.) for two days. After that time, the plants are unwrapped, and all leaves are found to have assumed a uniform yellowish color.

The plants are now cut into strips each having a width of about 2 inches by means of horizontal knives. The stalk parts are removed, and the remaining strips are placed on a grid and exposed to an artificially heated relatively dry regional air flow having a temperature of about 130° F. for about 42 hours. After that time, the strips are exposed to a controlled humid atmosphere having a relative humidity between 50–70%, so that they may absorb the moisture required to make them soft and pliable. The strips are now ready for fermentation and are found to have a uniform light brown color and an excellent texture.

*Example III*

This example relates to the drying of wrapper tobacco. Freshly harvested green tobacco leaves of the Connecticut B512 variety are assembled in piles each containing about 100 leaves with a total weight of about 250 pounds. Each of these piles is enclosed in a black "Pliofilm" sheet which is closely wrapped about the pile and substantially hermetically sealed by folding the edges of the sheet over each other; 10 pounds of silica gel are enclosed with each pile to absorb the excess moisture exuded by the leaves.

The enclosed piles are allowed to stand in a closed room at room temperature (about 90° F.) for two days. After that time, the piles are unwrapped and the leaves are found to have assumed a uniform yellowish color.

The leaves are now suspended in a barn or placed on a grid and subjected to an artificially heated air flow having a temperature of about 120° F. for 36 hours. After that time the leaves are exposed to a controlled humid atmosphere having a relative humidity between 50–70%, so that they may absorb the moisture required to make them soft and pliable. The leaves are now ready for fermentation and are found to have a uniform light brown color and an excellent texture.

*Example IV*

This example relates to the fermentation of cigar tobacco. Dried tobacco leaves or strips, obtained by means of the process of Example II or III, which have been allowed to absorb the moisture required to render them soft and pliable, are packed in loose piles each having a weight of about 160 pounds. Each of these piles is packed in a bag of plastic sheet material, such as "Pliofilm" or polyethylene which is tightly sealed by carefully folding a large overlap. Each of the sealed bags is placed in a wooden case, and these cases are piled in a sweat room.

The packing density of the tobacco in each bag amounts to about 10 pounds per cubic foot.

The cases are now exposed to a temperature of about 115° F. for wrapper tobaccos and of about 130° F. for filler tobaccos for a period of 15 days. After that time, the bags are opened and the leaves or strips are found to have a perfect uniform color and an excellent texture.

The phrase "substantially 25 pounds per square foot pressure," and the phrase "substantially 10 pounds per cubic foot density," in the claims includes 10 percent plus, or 10 percent minus, in pressure or density of each of the amounts specified.

It is to be understood that the invention is not limited to the above-described specific embodiments which may be modified in various ways within the scope of the invention. In particular, the curing process according to the invention is also applicable to other plants than tobacco, such as hops and the like.

Having described our invention, we claim:

1. The process for fermenting primary cured and dried tobacco leaves comprising a first step of exposing said leaves to a predetermined humid atmosphere for a sufficient period of time to permit said leaves to assume a predetermined soft and pliable state, a second step of substantially isolating the leaves from the outside atmosphere by enclosing a predetermined quantity of said leaves at room temperature in loosely stacked relation in a substantially hermetically sealed container, said mass substantially filling said container with the bottom layer of said leaves not exceeding a pressure of substantially 25 pounds per square foot, said stacked leaves having a density of substantially 10 pounds per cubic foot, a third step of placing said container in an artificially heated enclosure and rapidly raising the temperature therein to a predetermined high degree and uniformly heating the said loosely stacked leaves in said container to accelerate biological fermentation in the absence of free oxygen in the presence of the carbon dioxide generated by the plant, a fourth step of maintaining said enclosure temperature at said high degree for a period required to complete the biological fermentation of said leaves, a fifth step of removing said container from said enclosure and removing the cured and fermented leaves from said container.

2. The process for fermenting primary cured tobacco leaves comprising a first step of exposing said leaves to a predetermined humid atmosphere for a sufficient period to permit said leaves to absorb a range of moisture content from eighteen to thirty percent on a dry weight basis, a second step of substantially isolating the leaves from the outside atmosphere by enclosing a predetermined quantity of said leaves in loosely stacked relation in a substantially hermetically sealed container, said mass substantially filling said container with the layer of said leaves not exceeding substantially 25 pounds per square foot, said stacked leaves having a density of substantially 10 pounds per cubic foot, a third step of placing said container in an artificially heated enclosure and rapidly raising the temperature therein in a range substantially between one hundred twenty and one hundred forty degrees Fahrenheit and uniformly heating the said loosely stacked leaves in said container to accelerate biological fermentation in the absence of free oxygen in the presence of the carbon dioxide generated by the plant, a fourth step of maintaining said temperature range for the period required to complete the biological fermentation of said leaves to a predetermined degree, a fifth step of removing said container from said enclosure and removing the cured and fermented leaves from said container.

References Cited in the file of this patent

UNITED STATES PATENTS

| | | |
|---|---|---|
| 3,673 | Huse | July 22, 1844 |
| 48,689 | Huse | July 11, 1865 |
| 123,154 | Culp | Jan. 30, 1872 |
| 175,296 | Opitz | Mar. 28, 1876 |
| 240,604 | McQuown | Apr. 26, 1881 |
| 1,339,373 | Buensod | May 4, 1920 |
| 1,543,245 | Buensod | June 23, 1925 |
| 1,545,811 | Buensod | July 14, 1925 |
| 2,107,843 | Wurman et al. | Feb. 8, 1938 |
| 2,229,546 | Bogaty | Jan. 21, 1941 |

OTHER REFERENCES

Garner: The Production of Tobacco, pages 415, 416 and 419–422, revised first edition, published 1951 by the Blakiston Co., New York.